United States Patent
Thomas (10) Patent No.: US 11,332,197 B2
(45) Date of Patent: May 17, 2022

(54) COMPOSITE LOAD BEARING FLOORING

(71) Applicant: Zephyros, Inc., Romeo, MI (US)

(72) Inventor: Joseph R. Thomas, Imlay City, MI (US)

(73) Assignee: ZEPHYROS, INC., Romeo, MI (US)

( * ) Notice: Subject to any disclaimer, the term of this patent is extended or adjusted under 35 U.S.C. 154(b) by 280 days.

(21) Appl. No.: 16/598,368

(22) Filed: Oct. 10, 2019

(65) Prior Publication Data

US 2020/0114979 A1 Apr. 16, 2020

Related U.S. Application Data

(60) Provisional application No. 62/744,869, filed on Oct. 12, 2018.

(51) Int. Cl.
| | |
|---|---|
| *B62D 25/20* | (2006.01) |
| *B62D 65/02* | (2006.01) |
| *B62D 27/06* | (2006.01) |
| *B62D 29/00* | (2006.01) |

(52) U.S. Cl.
CPC ..... *B62D 25/2054* (2013.01); *B62D 25/2072* (2013.01); *B62D 27/06* (2013.01); *B62D 29/002* (2013.01); *B62D 65/024* (2013.01)

(58) Field of Classification Search
CPC ............ B62D 25/2054; B62D 25/2072; B62D 65/024; B62D 27/06; B62D 29/002
USPC .................................................... 296/184.1
See application file for complete search history.

(56) References Cited

U.S. PATENT DOCUMENTS

| | | |
|---|---|---|
| 3,317,471 A | 5/1967 | Johnson et al. |
| 4,017,986 A | 4/1977 | Miller |
| 4,438,254 A | 3/1984 | Doorakian et al. |
| 4,647,648 A | 3/1987 | Silvis et al. |
| 4,703,948 A | 11/1987 | Ehrlich |
| 4,978,562 A | 12/1990 | Wycech |
| 5,115,075 A | 5/1992 | Brennan et al. |
| 5,164,472 A | 11/1992 | White et al. |
| 5,275,853 A | 1/1994 | Silvis et al. |
| 5,401,814 A | 3/1995 | Schomaker et al. |
| 5,464,924 A | 11/1995 | Silvis et al. |
| 5,741,042 A | 4/1998 | Livingston et al. |
| 6,011,111 A | 1/2000 | Brennan et al. |
| 6,668,457 B1 | 12/2003 | Czaplicki |

(Continued)

FOREIGN PATENT DOCUMENTS

| | | |
|---|---|---|
| CN | 1433443 A | 7/2003 |
| CN | 101913255 A | 12/2010 |

(Continued)

OTHER PUBLICATIONS

Potentially related copending U.S. Appl. No. 62/925,480, filed Oct. 24, 2019.

(Continued)

*Primary Examiner* — Pinel E Romain
(74) *Attorney, Agent, or Firm* — The Dobrusin Law Firm, P.C.; Bryan S. Lemanski (57) ABSTRACT

A flooring member comprising: a structural member having one or more ducts extending along a length of the flooring member, each of the one or more ducts forming a hollow cavity extending along a length of each duct, the one or more ducts being integrally formed with the flooring member.

20 Claims, 3 Drawing Sheets

(56) References Cited

U.S. PATENT DOCUMENTS

| | | | |
|---|---|---|---|
| 6,699,554 B2 | 3/2004 | Sager et al. | |
| 6,730,713 B2 | 5/2004 | Czaplicki | |
| 6,736,442 B2 * | 5/2004 | Gebreselassie | B60H 1/0055 |
| | | | 296/97.23 |
| 6,855,652 B2 | 2/2005 | Hable et al. | |
| 7,125,461 B2 | 10/2006 | Czaplicki et al. | |
| 7,199,165 B2 | 4/2007 | Kassa et al. | |
| 7,318,873 B2 | 1/2008 | Czaplicki et al. | |
| 7,438,782 B2 | 10/2008 | Sheasley et al. | |
| 7,473,715 B2 | 1/2009 | Czaplicki et al. | |
| 7,581,932 B2 | 9/2009 | Coupe et al. | |
| 7,784,186 B2 | 8/2010 | White et al. | |
| 7,892,396 B2 | 2/2011 | Sheasley | |
| 8,236,128 B2 | 8/2012 | Kassa et al. | |
| 8,430,448 B2 | 4/2013 | Richardson et al. | |
| 8,696,048 B2 | 4/2014 | Griffin et al. | |
| 8,771,564 B2 | 7/2014 | Kassa et al. | |
| 9,427,902 B2 | 8/2016 | Werner | |
| 10,717,472 B2 * | 7/2020 | Wiberg | B62D 33/02 |
| 10,829,163 B2 * | 11/2020 | McCloud | B32B 5/06 |
| 2002/0024233 A1 | 2/2002 | Kleino | |
| 2003/0039792 A1 | 2/2003 | Hable et al. | |
| 2007/0270515 A1 | 11/2007 | Chmielewski et al. | |
| 2009/0202294 A1 | 8/2009 | Apfel | |
| 2009/0298974 A1 | 12/2009 | Chmielewski et al. | |
| 2010/0289242 A1 | 11/2010 | Nitsche et al. | |
| 2010/0314813 A1 * | 12/2010 | Wojtowicki | G10K 11/162 |
| | | | 267/141 |
| 2011/0039470 A1 | 2/2011 | Wakeman et al. | |
| 2011/0278802 A1 | 11/2011 | Nitsche et al. | |
| 2012/0251863 A1 | 10/2012 | Berger et al. | |
| 2013/0020019 A1 | 1/2013 | Nogues et al. | |
| 2013/0252529 A1 * | 9/2013 | Baldsiefen | B62D 25/20 |
| | | | 454/144 |
| 2013/0313857 A1 | 11/2013 | Lu | |
| 2015/0129116 A1 | 5/2015 | Richeton | |
| 2015/0165737 A1 | 6/2015 | Richardson et al. | |
| 2016/0046047 A1 | 2/2016 | Gleyal et al. | |
| 2016/0273160 A1 | 9/2016 | Braymand et al. | |
| 2017/0028998 A1 | 2/2017 | Davis et al. | |
| 2017/0050365 A1 | 2/2017 | Richardson | |
| 2017/0247821 A1 | 8/2017 | Siboni et al. | |
| 2018/0037703 A1 | 2/2018 | Richardson et al. | |
| 2019/0047634 A1 * | 2/2019 | McCloud | B32B 5/06 |

FOREIGN PATENT DOCUMENTS

| | | |
|---|---|---|
| CN | 102766343 A | 11/2012 |
| WO | 98/14498 A1 | 4/1998 |
| WO | 2007/008569 A1 | 1/2007 |
| WO | 2007/117663 A2 | 10/2007 |
| WO | 2008/010823 A2 | 1/2008 |
| WO | 2009/127638 A1 | 10/2009 |
| WO | 2010/054194 A1 | 5/2010 |
| WO | 2015/061291 A1 | 4/2015 |
| WO | 2015/095325 A1 | 6/2015 |

OTHER PUBLICATIONS

Potentially related copending U.S. Appl. No. 62/965,438, filed Jan. 24, 2019.

* cited by examiner

COMPOSITE LOAD BEARING FLOORING

FIELD

The present teachings generally relate to a composite load bearing flooring, and more specifically, to a pultruded structural and reinforcing member configured for a load bearing flooring.

BACKGROUND OF THE INVENTION

There is an ongoing effort in many industries to lighten the weight of articles. In many instances, this is achieved by the selection of materials that have a lower density, thinner section thicknesses or both, as compared with prior materials or structures. As a result, there is a potential for the weakening of structures, and the consequent need for stiffening or other structural reinforcement.

One particular ongoing effort may be found in the transportation industry. The transportation industry continuously makes attempts to improve commercial vehicles through light-weighting efforts and cost-savings plans. As a result, commercial vehicles, such as transportation trucks, are frequently modified to include lighter and cheaper materials. For example, commercial vehicles may implement a lightweight aluminum-based modular flooring to provide a uniform flooring across multiple vehicle platforms while also providing a simplified assembly process.

However, often times it is difficult for the lighter and cheaper materials used to meet industry requirements. For example, transportation vehicles may require flooring in the cargo container that meets specific load requirements or cross-sectional shapes to ensure cargo being transported is sufficiently supported. Furthermore, the flooring may require minimum insulation characteristics if the shipping container is insulated and configured to carry perishable items, such as food or biomedical items. Additionally, transportation vehicles may be required to support a weight of one or more fork trucks (i.e., a fork-lift) for loading and unloading the vehicles. As a result of the demanding requirements identified above, often times light-weighting efforts and cost-savings plans fail due to extensive design and validation time needed before an alternative solution may be implemented. Furthermore, because the alternative materials frequently used require unique reinforcement to meet the above-mentioned standards, the cost often saved on the base material is often exceeded by the additional of one or more structural reinforcements.

Examples of commercial vehicle flooring are disclosed in U.S. Pat. Nos. 4,703,948; 6,699,554; and 8,696,048; and U.S. Patent Publication Nos. 2013/0313857; and 2017/0028998, all of which are incorporated by reference herein for all purposes. It would be attractive to have an alternative flooring structure that meets one or more of the requirements identified above. What is needed is a composite flooring structure that meets that necessary load bearing requirements in commercial transportation. It would be attractive to have a flooring structure that is tunable and easily customizable to meet varying industry demands. What is needed it a flooring structural configured to include one or more reinforcement modifiers without drastically increasing the overall flooring cost. It would be attractive to have a flooring structure that easily replaces structures currently used in the transportation industry. What is needed is a modular composite flooring structure that meets the current industry demands and is easily interchangeable. It would be attractive to have a flooring structure that is customizable based on a specific type of transportation. What is needed is a composite flooring system having one or more cavities configured to receive a structural reinforcing material, insulation material, or both to meet specific transportation requirements based on the goods being transported.

SUMMARY

The present teachings meet one or more of the present needs by providing: a flooring member comprising: a structural member having one or more ducts extending along a length of the flooring member, each of the one or more ducts forming a hollow cavity extending along a length of each duct, the one or more ducts being integrally formed with the flooring member The present teachings meet one or more of the present needs by providing: a method of forming a flooring member, the method comprising: (a) pultruding a glass-filled polyurethane material to form the structural member; (b) laminating the structural member to a substrate, the substrate being a continuous filament mat; and (c) filling the cavities of each of the one or more ducts with an insert comprising one or more structural foam materials.

The present teachings meet one or more of the present needs by providing a flooring member, wherein: each of the one or more ducts is formed by one or more ribs having one or more connecting portions extending between the one or more ribs; the flooring member further comprises a substrate having the structural member disposed on a surface of the substrate; the structural member is an integrally formed pultruded material; the integrally formed pultruded material a polyurethane material; the integrally formed pultruded material includes a base material and one or more reinforcing additives; the one or more ducts are coplanar, parallel, or both; the flooring member includes an interlocking portion extending along one or more peripheral edges of the flooring member, the interlocking portion configured to secure the flooring member to one or more additional flooring members; the hollow cavity of at least one of the one or more ducts is filled with an insert; the insert is a structural foam reinforcing material; the one or more ducts have a uniform height and a uniform width; the one or more ducts vary in height and width; the one or more ducts have a cross-sectional area of greater than 290 cm$^2$; the flooring member has a maximum load capacity of greater than 20 kiloNewtons, greater than 40 kiloNewtons, or both; the flooring member is corrosion resistant, moisture resistant, antimicrobial, antifungal, antibacterial, or a combination thereof; the plurality of flooring members are interconnected via mating the interlocking portions of each of the flooring members; or the plurality of flooring members is configured to form a transportation trailer floor; the flooring member is thermally insulated by the insert; or a combination thereof.

The present teachings meet one or more of the present needs by providing: an alternative flooring structure that meets one or more of the requirements identified above; a composite flooring structure that meets that necessary load bearing requirements in commercial transportation; a flooring structure that is tunable and easily customizable to meet varying industry demands; a flooring structural configured to include one or more reinforcement modifiers without drastically increasing the overall flooring cost; a flooring structure that easily replaces structures currently used in the transportation industry; a modular composite flooring structure that meets the current industry demands and is easily interchangeable; a flooring structure that is customizable based on a specific type of transportation; and a composite flooring system having one or more cavities configured to receive a structural reinforcing material, insulation material, or both to meet specific transportation requirements based on the goods being transported.

DETAILED DESCRIPTION

The explanations and illustrations presented herein are intended to acquaint others skilled in the art with the teachings, its principles, and its practical application. Those skilled in the art may adapt and apply the teachings in its numerous forms, as may be best suited to the requirements of a particular use. Accordingly, the specific embodiments of the present teachings as set forth are not intended as being exhaustive or limiting of the teachings. The scope of the teachings should, therefore, be determined not with reference to the description herein, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

The teachings herein relate to a flooring member. The flooring member may function to provide structural support configured to withstand a desired load. The flooring member may function to provide structural support to an existing floor. The flooring member may be configured for a variety of applications, such as transportation vehicles, residential construction, commercial building construction, aerospace vehicles, nautical vehicles, structural containers, amusement park attractions (e.g., a roller coaster), or a combination thereof. The flooring member may be configured to support a specified load of one or more objects, one or more people, one or more additional vehicles, or a combination thereof. For example, the flooring member may be located within a trailer of a transportation vehicle and withstand a weight of transported goods, one or more vehicle operators, a fork-lift loading and unloading the trailer, or a combination thereof.

The flooring member may include one or more layers, one or more interconnected components, or a combination thereof. For example, the flooring member may include a first structural layer disposed on a second supporting layer to form the flooring member. The flooring member may include one or more additives to increase mechanical integrity, improve material characteristics, or both. The flooring member may vary in size and shape. The flooring member may be any size and shape based on a desired application. For example, the flooring member may have an overall size similar to a size of a trailer bed so that the flooring may replace a flooring of the trailer bed.

The flooring member may meet one or more desired requirements of a given industry. The one or more desired requirements may be a maximum load capacity, a thermal insulation value, a desired stiffness, a desired toughness, a specific weight requirement, desired dimensions, a compression factor, or a combination thereof. For example, the flooring member may have a load capacity of about 10 kiloNewtons (kN) or more, about 20 kN or more, or about 30 kN or more. The flooring member may have a load capacity of about 60 kN or less, about 50 kN or less, or about 40 kN or less. The flooring member may have a thermal resistance value (i.e., R-value measured in $F \cdot ft^2 \cdot h/Btu$) of about 5 or more, about 10 or more, or about 15 or more. The flooring member may have an R-value of about 30 or less, about 25 or less, or about 20 or less.

The flooring member may include a structural member. The structural member may function to provide structural integrity to the flooring member. The structural member may function to provide a supportive layer to the flooring member configured to contact one or more objects, one or more people, or both. The structural member may be rigid. The structural member may be integrally formed or may include a plurality of components joined together. One or more surfaces of the structural member may include contours, undulations, concave portions, convex portions, bends, curves, or a combination thereof. The structural member may include one or more friction modifiers disposed on the one or more surfaces to increase friction between the one or more surfaces and one or more items contacting the one or more surfaces. For example, the structural member may have an abrasive surface to increase friction between the surface and storage containers during transportation. The one or more friction modifiers may be an abrasive surface, textured surface, adhesive, or a combination thereof. The structural member may include one or more holes, one or more cutouts, one or more notches, one or more steps, or a combination thereof. For example, the structural member may include a plurality of through-holes extending through a thickness of the structural member to receive one or more fasteners that secure the structural member to a substrate, subfloor, or both.

The structural member may have a desired thickness. The structural member may have a thickness of about 10 mm or more, about 20 mm or more, or about 30 mm or more. The structural member may have a thickness of about 60 mm or less, about 50 mm or less, or about 40 mm or less. The structural member may maintain a substantially uniform thickness or may have segmented portions having varying thicknesses. For example, the structural member may have a first segment having a thickness of about 20 mm and a second segment having a thickness of about 10 mm. A thickness of the structural member may be configured to meet one or more mechanical characteristics. For example, the thickness of the structural member may directly correlate to a load capacity of the structural member. As such, an increase in thickness of the structural member may result in an increased load capacity, or vice versa.

The structural member may be formed using one or more manufacturing methods. The structural member may be injection-molded, cast, stamped, or a combination thereof. The structural member may be extruded, pultruded, or both. The pultrusion process may be a continuous molding process where one or more fibers saturated with one or more polymers are extended through (i.e., pulled through) a heated die to form a final pultruded part. The pultrusion may be performed according to the teachings of PCT Application No. PCT/US2018/031022, filed on May 4, 2018; and US Patent Publication No. 2018/0036970, filed on Mar. 10, 2016; all of which is incorporated herein for all purposes. The pultruded structural member may be formed from any materials based on desired material properties that may be pultruded. For example, the structural member may be formed from one or more fiber bundles pre-impregnated with one or more polymers, impregnated with one or more polymers during the pultrusion process, or both. The structural member may include one or more fiber bundles that include one or any combination of carbon, glass, aramid and basalt fibers, impregnated with polyamide (PA, such as Nylon 6 and Nylon 66), polypropylene (PP), polyphenylene sulfide (PPS), polybutylene terephthalate (PBT), polyetheretherketone (PEEK), polyethylene terephthalate (PET), polycarbonate, polyethylene, polystyrene, polyvinyl chloride, or any combination thereof. Fiber volume fractions range from about 40 to about 60 wt. %. The structural member may be antimicrobial, antifungal, antibacterial, or a combination thereof. The structural member may be moisture-resistant, heat-resistant, insulating, noise-absorbing, vibration-dampening, or a combination thereof. The structural member may be moisture-wicking. The structural member may be corrosion-resistant.

The structural member may include one or more ribs. The one or more ribs may function to form one or more walls of one or more cavities. The one or more ribs may function to provide structural support to the structural member. The one or more ribs may be integrally formed with the structural member. For example, the structural member may be pultruded in a desired shape having a plurality of ribs. The ribs may extend along a longitudinal axis of the structural member, a latitudinal axis of the structural member, or both. For example, the ribs may extend along the structural member coaxial to the longitudinal axis, parallel to the longitudinal axis, or both. The ribs may project from a surface of the structural member. For example, the ribs may project substantially orthogonal to a base surface of the structural member. The ribs may project from a surface at any desired angle. The ribs may project relative to a surface of the structural member at an angle of about 30 degrees or more, about 45 degrees or more, or about 60 degrees or more. The ribs may project relative to a surface of the structural member at an angle of about 120 degrees or less, about 105 degrees or less, or about 90 degrees or less. The ribs may have a thickness substantially equal to an overall thickness of the structural member. The ribs may have an increased thickness relative to the structural member, a decreased thickness relative to the structural member, or both. For example, a first set of ribs may have a thickness greater than the thickness of the structural member and a second set of ribs may have a thickness less than the thickness of the structural member. The ribs may be locally reinforced with one or more reinforcing additives during the pultrusion process, after the pultrusion process, or both. For example, the ribs may be locally reinforced with glass to increase structural integrity of the ribs. The ribs may have a uniform height or varying heights. The height of the ribs may be about 10 mm or more, about 20 mm or more, or about 30 mm or more. The height of the ribs may be about 60 mm or less, about 50 mm or less, or about 40 mm or less.

The ribs may be connected via one or more connecting portions. The one or more connecting portions may function to bridge a gap between ribs. The connecting portions may be integrally formed with the ribs, the structural member, or both. The connecting portions may extend between one or more gaps between the ribs. The gaps may have a length of about 10 mm or more, about 20 mm or more, or about 30 mm or more. The gaps may have a length of about 60 mm or less, about 50 mm or less, or about 40 mm or less. The connecting portions may be locally reinforced similar to the ribs, using alternative reinforcing additives, or both. The connecting portions along with the ribs may be structurally rigid. The connecting portions may be substantially planar. The connecting portions may include one or more contours, one or more curves, one or more arcs, one or more bends, or a combination thereof.

The connecting portions and one or more ribs may form one or more ducts. The one or more ducts may function to increase structural integrity of the structural member. The one or more ribs, the one or more connecting portions, or both may form walls of the ducts. For example, a pair of ribs may form opposing walls of a duct, and a connecting portion extending between the pair of ribs may form a top wall of the duct. The ducts may have about two walls or more, about three walls or more, or about four walls or more. For example, the ducts may have three integrally formed walls and form a substantially U-shaped duct. The ducts may be a shape other than a U-shape. The ducts may be C-shaped, V-shaped, W-shaped, O-shaped, D-shaped, G-shaped, or a combination thereof. The ducts may extend along a length of the structural members or a width of the structural members. One or more surfaces of the ducts may be substantially coplanar. One or more surfaces of the ducts may taper across an overall surface of the structural member. For example, a uppermost surface of the structural member formed by an uppermost surface of the ducts may slope to a desired edge of the structural member. The ducts may extend to one or more peripheral edges of the structural member. The ducts may form one or more peripheral edges of the structural member. The structural member may have any desired number of ducts by modifying dimensions of the ribs, dimensions of the connecting portions, or both. For example, the structural member may have a plurality of ducts extending along a length of the structural member, and segmented width of the structural member may include a desired number of ribs. For example, a segmented width of approximately 25 mm may include about 5 or more ribs, about 6 or more ribs, or about 7 or more ribs. The segmented width may include about 10 or less ribs, about 9 or less ribs, or about 8 or less ribs.

The one or more ducts may have a cavity. The cavities may function to receive one or more inserts to reinforce the structural member. The cavities may extend along an entire length of the ducts or a portion of the ducts. The cavities may follow a shape substantially similar to the one or more walls of the ducts (i.e., an interior surface of the one or more ribs, an interior surface of the one or more connecting portions, or both). The cavities may be fully enclosed. The cavities may have one or more open segments. The cavities may be open along a top surface of the structural member, a bottom surface of the structural member, one or more peripheral edges of the structural member, or a combination thereof. The cavities may include one or more crossmembers extending between walls of the duct to increase structural integrity. The cavities may be free of one or more crossmembers.

The cavities may receive an insert. The insert may function to increase structural integrity of each duct. The insert may function to tune one or more structural characteristics of the structural member. For example, the insert may be configured to modify one or more characteristics of the structural member, such as load capacity, strength, stiffness, elasticity, compressibility, noise-absorption, moisture-absorption, moisture-resistance, vibration-dampening, thermal insulation, or a combination thereof. The insert may be a solid component. For example, the insert may be a rod extending through the ducts to increase structural integrity. The insert may be an adhesive material, a structural foam material, or both. The structural foam material may be a structural foam material as taught in U.S. Pat. Nos. 4,017,986; 6,668,457; 6,730,713; 7,199,165; 7,438,782; 7,473,715; 7,892,396; 8,236,128; 8,771,564; and 9,427,902, all of which are incorporated herein for all purposes. For example, an inner surface of the cavity may include one or more expandable materials configured to expand upon activation to fill the cavity. The insert may be any size and shape. The insert may include a plurality of loose particles. The insert may be a liquid, foam, solid, or a combination thereof.

The expandable material may be configured to adhere the structural member to a substrate. The substrate may function to support the structural member. The substrate may have overall dimensions similar to the structural member. The substrate may be a lowermost surface of the flooring member. For example, the substrate may be positioned beneath the structural member so that the structural member is contacted by one or more objects housed within the transportation trailer. The substrate may any material that may support the structural member, secure the structural member, or both. For example, the expandable material housed within the cavities may expand to increase structural integrity of the structural member, expand outside of the cavities, and bond to a subfloor of a transportation trailer. The subfloor may be metal, a polymer, wood, or a combination thereof. The substrate may be a fibrous material, a filament mat, or a combination thereof. The structural member may be directly adhered to the substrate or may include an intermediate layer. The structural member may be directly adhered to the substrate via the insert, an additional adhesive material, or both. The structural member may be fastened to the substrate free of adhesives. For example, the structural member may be fastened to the substrate via one or more fasteners, such as screws, bolts, pins, other mechanical fasteners, or a combination thereof.

A plurality of flooring members may be interconnected via one or more interlocking portions. The interlocking portions may function to secure one or more flooring members together. The interlocking portions may be located along a peripheral edge of the structural member, substrate, or both. The interlocking portions may be integrally formed with the structural member. The interlocking portions may be any mechanical fastener configured to lock opposing flooring members. For example, a first flooring member may include a male portion and a second flooring member may include a female portion so that the female portion receives the male portion and interconnects the first flooring member and the second flooring member. The interlocking portions may be a hook, latch, clasp, fastener, loop, tooth, pin, or a combination thereof. The interlocking portion may be a flange. The interlocking portions may include one or more flexible portions, one or more structurally rigid portions, or a combination thereof. The interlocking portions may include one or more adhesives to bond a plurality of flooring members together.

By interlocking a plurality of structural members, flooring members, or both, a flooring assembly may be formed. Each flooring member or structural member may be modularized so that a user may select a desired number of modules to form an overall desired shape, size, or both of a flooring assembly. The modules may be configured to overlay an existing flooring structure, replace an existing flooring structure, or both. As such, it is contemplated that the flooring members are customizable and tunable based on a desired application and desired mechanical and material characteristics.

Figure 1:
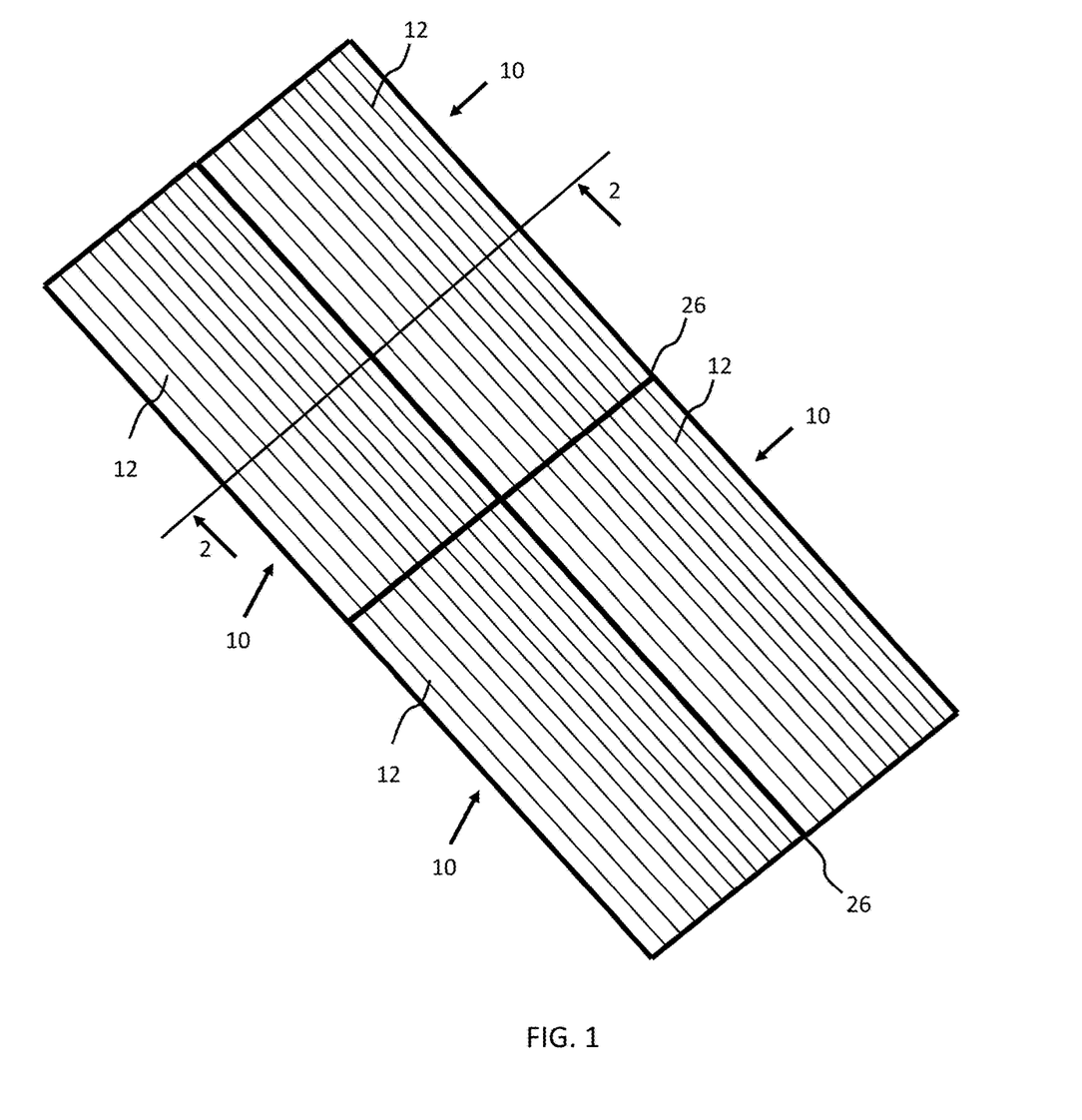
FIG. 1 is a top perspective view of a plurality of interconnected flooring members.

Turning now to the figures, FIG. 1 illustrates a top perspective view of a plurality of flooring members 10 having a structural member 12 disposed on a substrate (not shown). As shown, the flooring members 10 are interconnected via a plurality of interlocking portions 26 extending along peripheral edges of each flooring member 10.

Figure 2A:
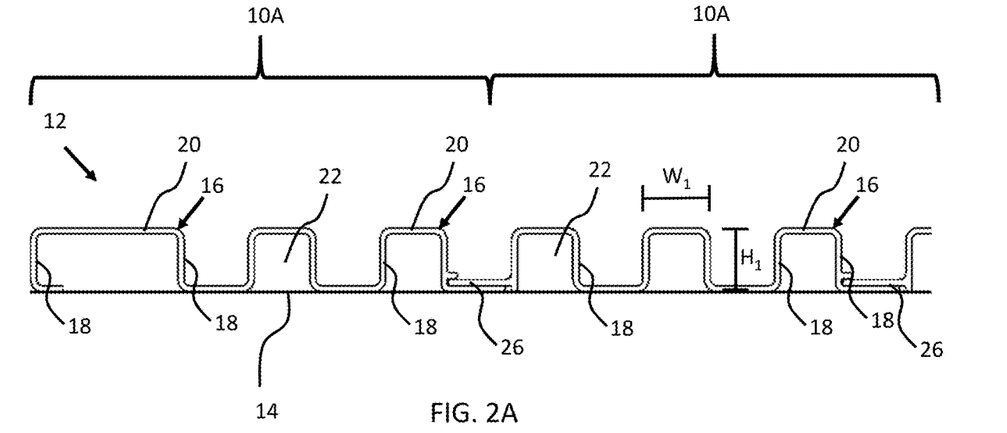
FIG. 2A is an illustrative cross-sectional view 2-2 of FIG. 1.
Figure 2B:
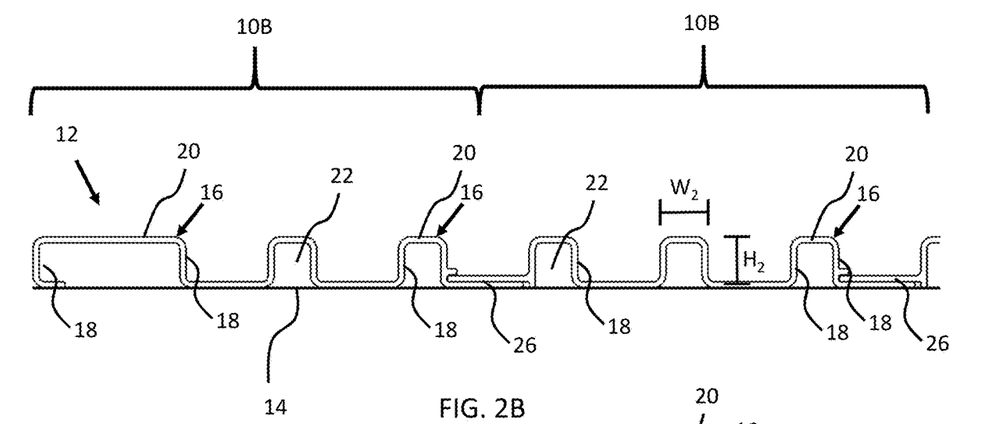
FIG. 2B is an illustrative cross-sectional view 2-2 of FIG. 1.

FIGS. 2A and 2B illustrate alternative cross-sectional views 2-2 of the flooring members 10 of FIG. 1. The flooring members 10 each include a structural member 12 disposed on a surface of a substrate 14. It is noted that while the structural member 12 may be disposed on a substrate 14, the structural member 12 may also be used without an added substrate 14. The structural member 12 includes a plurality of ducts 16 formed by one or more connecting portions 20 extending between one or more vertical ribs 18. The ducts 16 extend along a length of the flooring member 10 and may be substantially coplanar, parallel, or both. Each duct 16 includes a cavity 22 extending through a length of the duct 16. The flooring members 10 are interconnected via a plurality of interlocking portions 26 extending along peripheral edges of each flooring member 10. As shown, FIGS. 2A and 2B illustrate varying configurations of the flooring members 10. FIG. 2A illustrates a pair of first flooring members 10A with a plurality of ducts 16 having a width ($W_1$) and a height ($H_1$). Alternatively, FIG. 2B illustrates a pair of second flooring members 10B with a plurality of ducts 16 having a width ($W_2$) and a height ($H_2$). As shown, the width ($W_1$) and the height ($H_1$) of the first flooring members 10A are greater than the width ($W_2$) and the height ($H_2$) of the second flooring members 10B so that the ducts 16 of the first flooring members 10A have overall larger dimensions than the ducts 16 of the second flooring members 10B.

Figure 3:
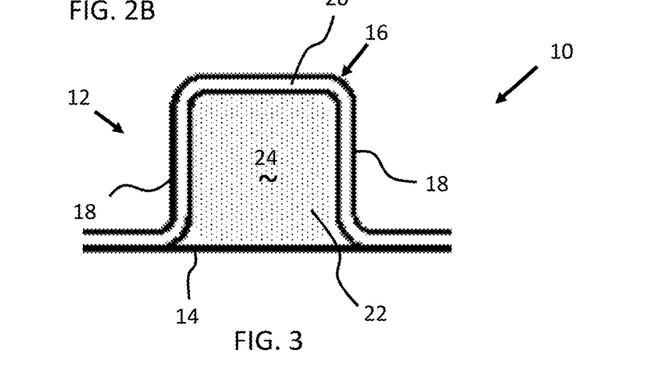
FIG. 3 is a close-up cross-sectional view of a flooring member.

FIG. 3 illustrates a close-up cross-sectional view of a duct 16 of a flooring member 10. The duct 16 is formed by a connecting portion 20 extending between a pair of vertical ribs 18. The duct 16 is integrally formed with a structural member 12 disposed on a substrate 14. The geometry of the duct 16 forms a cavity 22 extending along a length of the duct 16. As shown, the duct 16 may be filled with one or more inserts 24, such as a foamable material, solid reinforcing material, expanding material, reinforcing material comprising one or more loose particles, or a combination thereof.

ILLUSTRATIVE EXAMPLES

Example 1

Figure 4:
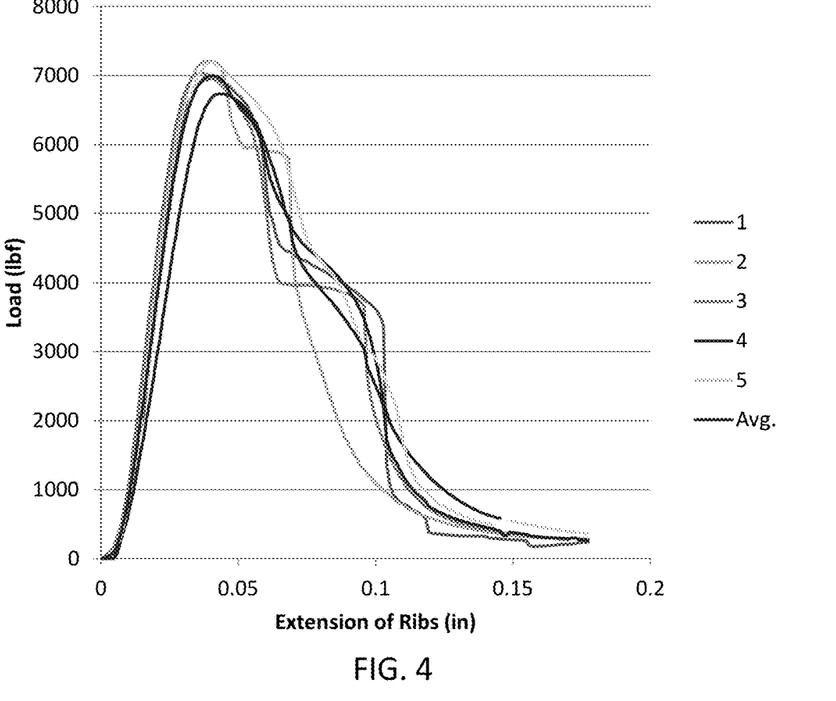
FIG. 4 is a graph illustrating load-bearing test results of the flooring member disclosed herein.

A pultruded structural member is formed in the shape of a double I-beam in accordance with the present teachings. A force of approximately 12.595 pounds per square inch (psi) is applied on an axis of the structural member to illustrate a load applied in a direction similar to an object of person. The test results from test samples 1-5 (along with an average result) are shown in FIG. 4.

Example 2

Figure 5:
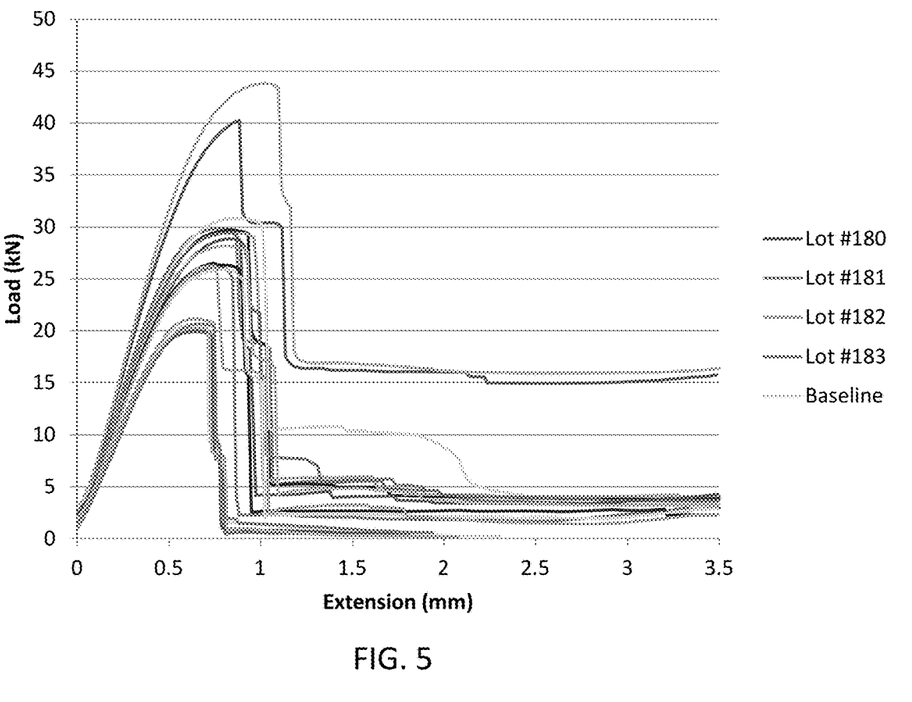
FIG. 5 is a graph illustrating load-bearing test results of the flooring member having an insert as disclosed herein.

Pultruded members are formed similar to Example 1 and filled with four structural adhesive foams having varying material characteristics. Samples are cut into 25 mm lengths perpendicular to a fiber direction of the structural members, and crushed in accordance to the method of Example 1. Table 1 below and FIG. 5 summarize the test results.

TABLE 1

Example 2 Test Results

| Sample # | Foam Color | Foam Density (g/cc) | Peak Load (kN) | Toughness (J) | Stiffness (kN/mm) |
|---|---|---|---|---|---|
| 180 | Purple | 0.82 | 42.01 | 69.54 | 63.46 |
| 181 | Green | 0.52 | 30.15 | 34.08 | 54.85 |
| 182 | Pink | 0.50 | 28.99 | 30.72 | 52.53 |
| 183 | Blue | 0.30 | 26.21 | 22.80 | 50.12 |
| Baseline | N/A | N/A | 20.45 | 11.40 | 42.13 |

The explanations and illustrations presented herein are intended to acquaint others skilled in the art with the invention, its principles, and its practical application. The above description is intended to be illustrative and not restrictive. Those skilled in the art may adapt and apply the invention in its numerous forms, as may be best suited to the requirements of a particular use.

Accordingly, the specific embodiments of the present invention as set forth are not intended as being exhaustive or limiting of the teachings. The scope of the teachings should, therefore, be determined not with reference to this description, but should instead be determined with reference to the appended claims, along with the full scope of equivalents to which such claims are entitled. The omission in the following claims of any aspect of subject matter that is disclosed herein is not a disclaimer of such subject matter, nor should it be regarded that the inventors did not consider such subject matter to be part of the disclosed inventive subject matter.

Plural elements or steps can be provided by a single integrated element or step. Alternatively, a single element or step might be divided into separate plural elements or steps.

The disclosure of "a" or "one" to describe an element or step is not intended to foreclose additional elements or steps.

While the terms first, second, third, etc., may be used herein to describe various elements, components, regions, layers and/or sections, these elements, components, regions, layers and/or sections should not be limited by these terms. These terms may be used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The disclosures of all articles and references, including patent applications and publications, are incorporated by reference for all purposes. Other combinations are also possible as will be gleaned from the following claims, which are also hereby incorporated by reference into this written description.

Unless otherwise stated, a teaching with the term "about" or "approximately" in combination with a numerical amount encompasses a teaching of the recited amount, as well as approximations of that recited amount. By way of example, a teaching of "about 100" encompasses a teaching of within a range of 100+/− 15.

ELEMENT LIST

10 Flooring Member
10A First Flooring Member
10B Second Flooring Member
12 Structural Member
14 Substrate
16 Duct
18 Rib
20 Connecting Portion
22 Cavity
24 Insert
26 Interlocking Portions
H1 Height (Duct of First Flooring Member)
H2 Height (Duct of Second Flooring Member)
W1 Wdth (Duct of First Flooring Member)
W2 Width (Duct of Second Flooring Member)

What is claimed is:

1. A flooring member comprising:
   (a) a structural member formed from a single piece of material having a plurality of interconnected and spaced apart ducts extending along a length of the flooring member, each of the one or more ducts forming a hollow cavity extending along a length of each duct; and
   (b) a substrate, wherein the structural member is disposed along a surface of the substrate so that openings of each duct are closed by the substrate.

2. The flooring member according to claim 1, wherein each of the one or more ducts is formed by one or more ribs having one or more connecting portions extending between the one or more ribs.

3. The flooring member according to claim 1, wherein the substrate is adhered to the structural member by an insert positioned within at least one of the plurality of ducts.

4. The flooring member according to claim 1, wherein the structural member is an integrally formed pultruded material.

5. The flooring member according to claim 4, wherein the integrally formed pultruded material is a polyurethane material.

6. The flooring member according to claim 5, wherein the integrally formed pultruded material includes a base material and one or more reinforcing additives.

7. The flooring member according to claim 1, wherein the one or more ducts are coplanar, parallel, or both.

8. The flooring member according to claim 1, wherein the flooring member includes an interlocking portion extending along one or more peripheral edges of the flooring member transverse to the plurality of ducts, the interlocking portion configured to secure the flooring member to one or more additional flooring members.

9. The flooring member according to claim 1, wherein the hollow cavity of at least one of the one or more ducts is filled with an insert.

10. The flooring member according to claim 9, wherein the insert is a structural foam reinforcing material.

11. The flooring member according to claim 1, wherein the one or more ducts have a uniform height and a uniform width.

12. The flooring member according to claim 1, wherein the one or more ducts vary in height and width.

13. The flooring member according to claim 1, wherein the one or more ducts have a cross-sectional area of greater than 290 cm$^2$.

14. The flooring member according to claim 8, wherein the flooring member has a maximum load capacity of greater than 20 kiloNewtons.

15. The flooring member according to claim 14, wherein the flooring member has a maximum load capacity of greater than 40 kiloNewtons.

16. The flooring member according to claim 1, wherein the flooring member is corrosion resistant, moisture resistant, antimicrobial, antifungal, antibacterial, or a combination thereof.

17. A plurality of flooring members according to claim 8, wherein the plurality of flooring members are interconnected by mating the interlocking portions of each of the flooring members.

18. The plurality of flooring members according to claim 17, wherein the plurality of flooring members are configured to form a transportation trailer floor.

19. The flooring member according to claim 10, wherein the flooring member is thermally insulated by the insert.

20. A method of forming a flooring member, comprising:

(a) pultruding a glass-filled polyurethane material to form a structural member, wherein the structural member includes one or more ducts extending along a length of the flooring member;

(b) laminating the structural member to a substrate, the substrate being a continuous filament mat; and (c) filling a cavity of each of the one or more ducts with an insert comprising a structural foam material.

* * * * *